Dec. 15, 1925.  1,565,366

H. HOWARD

APPARATUS FOR THE ABSORPTION OF GASES IN LIQUIDS

Filed Dec. 6, 1922  2 Sheets-Sheet 1

Inventor:
Henry Howard
by
Byrnes Townsend & Brickenstein
Attorneys.

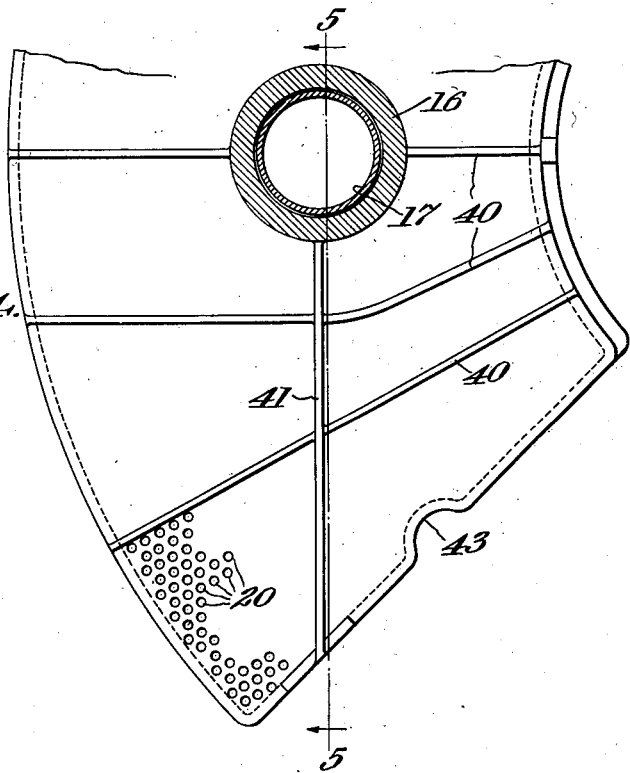
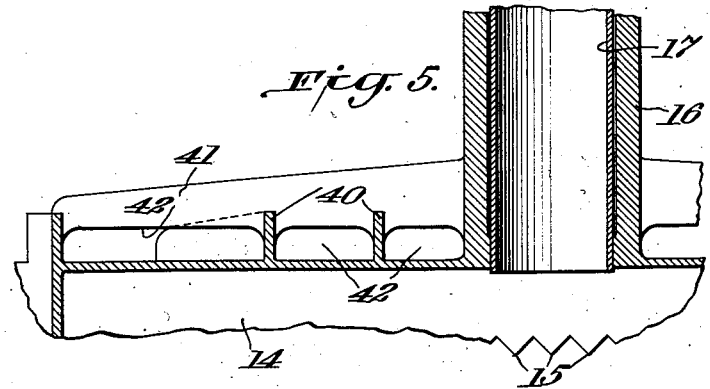

Patented Dec. 15, 1925.

1,565,366

UNITED STATES PATENT OFFICE.

HENRY HOWARD, OF CLEVELAND, OHIO, ASSIGNOR TO THE GRASSELLI CHEMICAL COMPANY, OF CLEVELAND, OHIO, A CORPORATION OF OHIO.

APPARATUS FOR THE ABSORPTION OF GASES IN LIQUIDS.

Application filed December 6, 1922. Serial No. 605,279.

*To all whom it may concern:*

Be it known that I, HENRY HOWARD, a citizen of the United States, residing at Cleveland, in the county of Cuyahoga and State of Ohio, have invented certain new and useful Improvements in Apparatus for the Absorption of Gases in Liquids, of which the following is a specification.

This invention relates to apparatus for the impregnation of liquids with gases or the absorption of gases in liquids and relates more particularly to the absorption of sulfuric anhydrid as a step in the process of making sulfuric acid.

In its more specific aspect the invention relates more particularly to what are commonly referred to as "98% absorbers."

It is the general object of the invention to provide an apparatus of the character mentioned which is exceedingly simple in construction and operation and is highly efficient in its function of causing the absorption of the gases, and of sulfuric anhydrid in particular, in the liquid.

The principle of operation is generally the same as that disclosed in my co-pending application Ser. No. 607,202 filed Dec. 15, 1922, Patent No. 1529997, issued March 17, 1925.

For a full understanding of the invention reference is made to the accompanying drawings in which Fig. 1 is a plan view partly in section of an apparatus embodying the invention;

Fig. 3 is a fragmentary sectional view of a detail;

Fig. 4 is a fragmentary plan view partly in section of a particular construction of perforated plate.

Fig. 5 is a fragmentary vertical section of the construction shown in Fig. 4, the section being taken along line 5—5.

Figure 1:
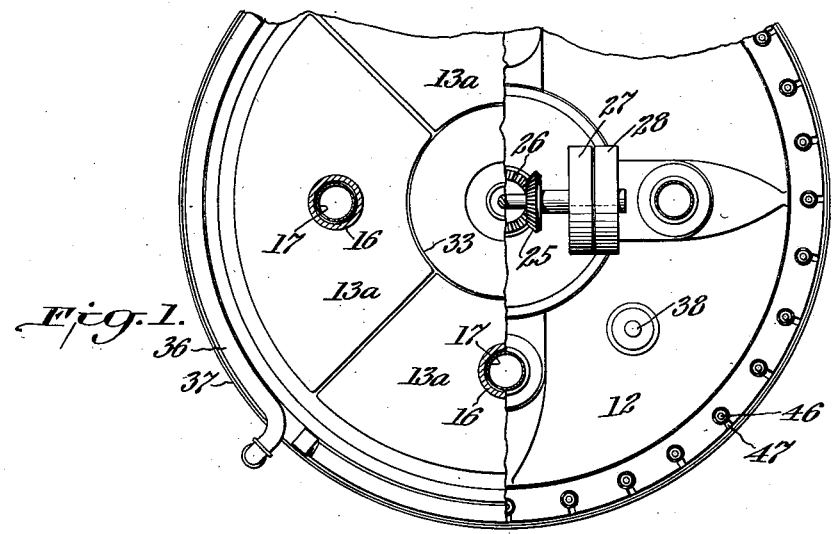
Figure 2:
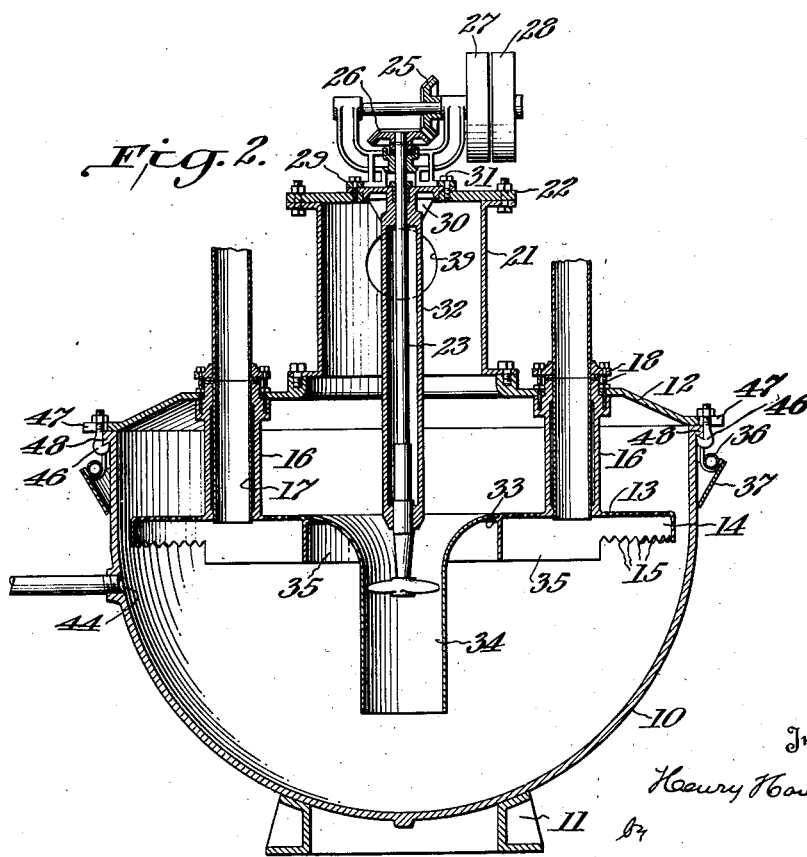
Fig. 2 is vertical section therethrough.

In the drawings 10 represents the absorption chamber which preferably has the form of a substantially semispherical bowl supported on a base 11. From the cover 12 is suspended an annular plate 13 which is circumferentially spaced from the walls of the bowl and has a depending curtain 14 provided with serrations 15 at its lower end.

The suspending means preferably comprise hollow studs 16 serving simultaneously as gas inlet conduits. In the arrangement disclosed, which is primarily adapted to serve as a 98% absorber in the process of making sulfuric acid, the plate and the studs are made of cast-iron and for the sake of simplicity in the manufacture and for reasons to be pointed out later on, the plate is made of individual quadrants 13$^a$ and each quadrant carries a stud as an integral part.

In order to prevent $SO_3$ gas from coming into direct contact with the cast-iron studs I preferably use steel pipes or linings 17 as the immediate gas conduits. Connection to the external gas conduits may be made in any suitable way, as for instance by means of flange couplings 18 bearing upon the flanges of pipes 17 as indicated.

By this arrangement the plate quadrants may be rigidly supported from the cover so as to form operatively a single plate.

The plate 13 is provided with a large number of relatively small perforations 20 which must be drilled when the plate is of cast-iron as above referred to. Experience has taught that these small perforations become easily plugged with sulfate of iron. I have avoided this difficulty by counterboring with a larger drill, thereby leaving only a relatively thin portion at the upper surface of the plate to define the smaller perforation. In practice the plate may advantageously have a thickness of $\frac{1}{2}$ inch while the thickness of the upper portion left by counterboring may be $\frac{3}{16}$ inch.

The cover 12 has a central aperture from which rises a dome 21 which has a detachable cover 22. Centrally through the cover 22 extends a shaft 23 carrying at its lower end a propeller 24. The shaft 23 and all the parts connected with it, such as gears 25, 26 and pulleys 27, 28 are supported upon a base plate 29 which in turn rests upon and is secured to a bearing 30 removably fitted in the cover 22. By the removal of bolts 31 the shaft and correlated parts may be removed as a unit. From the bearing 30 depends, preferably as an integral part thereof, a sleeve 32 defining at its lower end a second bearing for the shaft. This construction makes it possible to make the shaft of cast-iron.

The inner edge of the quadrants forming the plate 13 is formed with a circular shoulder 33 affording a seat for a tubular element 34 which is preferably trumpet shaped, at its upper end. From the inner edge and from the latter edges of each quadrant depends a continuous curtain 35 which adjoins the curtain 14 but extends below the level of the serrations. The gas entering through each individual gas supply conduit is normally confined directly under the individual quadrants to which the conduit is connected. The different quadrants therefore need not make a gas-tight abutting fit and no gas seal is necessary between the plate 13 and the tubular element 34.

The upper portion of the bowl 10 may be surrounded by a cooling system in the form of a spray pipe 36 directing a spray against the walls of the bowl. An apron 37 is advantageously used to conduct the water against the walls.

A pipe 38 extends through the cover for feeding absorbent liquid into the bowl, preferably into proximity to the propeller so that it is readily and uniformly mixed with the body of the impregnated liquid.

The dome has an outlet 39 through which the unabsorbed gas is drawn off.

In Figs. 4 and 5 is shown an arrangement for making plate 13 relatively thin and yet strong and rigid. Each quadrant is provided with a plurality of radial ribs 40 and with a rib 41 defining a chord through the hollow stud 16. The rib 41 has open spaces 42 between the points of the intersection with the radial ribs to afford passages for the liquid flowing outwardly from the center.

As indicated, one side of a quadrant may be formed to define a semi-circular recess 43. Two adjoining recesses 43 in the abutting sides of two quadrants thus may provide an opening for mounting a thermometer well or vent nozzle.

An opening 44 is provided for continuously conducting away impregnated liquid or 98% sulfuric acid in particular. For this purpose a suitable overflow pipe may be connected with the opening 44.

The chamber is filled with absorbent liquid, such as sulfuric acid (65 Bé. or over) to a level above the plate 13. The gas enters into the spaces defined by the curtains 35 and 14 and passes upwardly through the perforations 20 into the liquid above plate 13. The propeller forces a continuous stream of the liquid preferably upwardly through the tubular element 34 outwardly over the plate 13 and downwardly between the periphery of the plate and the walls of the bowl or the direction of the propellor may be reversed pulling the acid downwardly through the center pipe radially inwardly over the perforated plates and upwardly between the periphery of the plate and the wall of the bowl, the main object being to provide rapid circulation of the absorbing acid over the perforated plates, thereby insuring acid of the desired concentration and temperature always in contact with the gases to be absorbed. The gas is released from the upper end of the perforations as a multitude of minute bubbles tending to pass upwardly through liquid. An enormous surface of contact is thus provided between the liquid and the gas. The rate of circulation may be sufficiently high to rapidly carry the liquid from above the plate into the body of liquid below the plate and thereby prevent undue local heating. The heat is uniformly dissipated principally by convection from the walls of the bowl. At normal temperatures, excluding hot summer days, this mode of dissipation is sufficient for successful operation. In hot weather the spray device 36 may be operated for obtaining the necessary cooling.

By means of the subdivision of the gas into a multitude of minute bubbles it is presented to the liquid in a form in which it is most readily absorbed and by means of the high rate of circulation the liquid is maintained in a condition in which it most readily absorbs the gas.

At the same time the absorbent liquid is continuously fed into the bowl in such a way as to ensure a uniform consistency. The liquid drawn off is for this reason correspondingly uniform.

The construction described has also special significance. Contact of $SO_3$ with cast-iron develops unequal stresses and cracks. In order to minimize these effects, the plate is preferably made as thin as possible so as to permit the 98% acid to come in contact with a maximum of surface for a minimum of volume of the cast-iron. Ribs or webs 40 and 41 are formed to provide the necessary mechanical strength and rigidity.

While cast-iron is resistive against the action of 98% acid and while, as above stated, the particular arrangement has been provided inter alia to maintain the acid as nearly as possible uniform throughout, a gradual corrosion is nevertheless bound to take place particularly due to the action of $SO_3$ gas below the plate 13.

In order to afford ready access to all parts, the mechanism within the bowl has been suspended from the bowl to be removable therewith as a single unit. The cover 12 is attached by means of hook clamps 46 fitting into recesses 47 in the cover and engaging under a flange 48 at the upper edge of the bowl. The plate 13 has been made of a number of quadrants or sections so that any one of them may be replaced without the necessity of discarding the whole plate and without disconnecting all the studs from the cover. Each stud is separately removable and the tube element 34 may be immediately lifted out of its place. The sleeve 32 can be readily detached and replaced without disturbing the relation of the shaft 23 and its driving mechanism. The shaft 23 may be readily replaced by disconnecting merely the parts connected to it. All parts are accessible and removable with the smallest changes possible in respect to the other parts of the structure.

The serrations 15 on the curtain 14 serve the purpose to break up the gas into individual bubbles in case the perforations 20 become increasingly plugged up to such an extent that they become substantially ineffective. The serrations are merely intended as a make shift until the condition is discovered.

The absorption chamber is preferably made bowl-shaped in order to reduce its weight and to eliminate more or less stagnant regions. In the form shown the liquid returning to the lower portion of the bowl sweeps along the uniformly curved walls and is thoroughly mixed.

I claim:

1. In apparatus for impregnating a liquid with a gas, the combination of a closed chamber, a centrally apertured plate having multitudinous small perforations and being peripherally spaced from the wall of the chamber, means for introducing gas beneath the plate, and means for causing circulation of a liquid through the chamber, and radially over the plate.

2. In apparatus for impregnating a liquid with a gas, the combination of a closed chamber, a centrally apertured plate having multitudinous small perforations and being peripherally spaced from the walls of the chamber, means for introducing gas beneath the plate, a tubular element depending from the edge of the plate defined by the central aperture, and means for circulating liquid through the tubular element and radially over the plate.

3. In apparatus for impregnating a liquid with a gas, the combination of a closed chamber, a centrally apertured plate having multitudinous small perforations and being peripherally spaced from the wall of the chamber, means for introducing gas beneath the plate, curtains depending from the plate along the periphery thereof and along the edge defined by the central aperture for confining the gas against lateral flow beyond the edges of the plate, and means for circulating the liquid upwardly through the central aperture radially outwardly over the plate.

4. In apparatus for impregnating a liquid with a gas, the combination of a closed chamber, a centrally apertured plate having multitudinous small perforations and being peripherally spaced from the wall of the chamber, means for introducing gas beneath the plate, a curtain depending from the outer peripheral edge of the plate and serrated at its bottom, a curtain depending from the edge of the plate defined by the central aperture, said second curtain extending to points below the level of the serrated edge, and means for circulating the liquid upwardly through the central aperture radially outwardly over the plate.

5. In apparatus for making sulfuric acid, the combination with an absorption chamber, of a cover therefor, a plate having multitudinous small perforations, means for introducing gas beneath the plate and means for continuously circulating the absorbent liquid over the plate, the gas-introducing means, the circulating means and the plate being connected with the cover to be removable with the latter as a single mechanical unit.

6. In apparatus for making sulfuric acid, a plate of cast iron having multitudinous small perforations, said plate being composed of a plurality of separately detachable sections.

7. In apparatus for making sulfuric acid, a thin plate of cast iron having multitudinous small perforations and strengthening ribs on one of its surfaces.

8. In apparatus for making sulfuric acid, a thin plate of cast iron having multitudinous small perforations, said plate being composed of a plurality of sections and having strengthening ribs on one of its surfaces.

9. In apparatus for making sulfuric acid, a plate having multitudinous small perforations and pipes integrally connected with the plate and extending substantially at right angle thereto.

10. In apparatus for making sulfuric acid, a plate having multitudinous small perforations, pipes extending substantially at right angle thereto, the plate and the pipes being of cast iron and forming an integral construction, and acid resisting linings for the pipes.

11. In apparatus for making sulfuric acid, a plate having multitudinous small perforations, and pipes extending substantially at right angle thereto, the plate being composed of a plurality of separately detachable sections and the pipes forming integral parts of the different sections.

12. In apparatus for making sulfuric acid, a plate having multitudinous small perforations and pipes extending substantially at right angle thereto, the plate and the pipes being of cast iron and composed of a plurality of separately detachable sections including each a plate section and a pipe.

13. In apparatus for making sulfuric acid, a thin plate of cast iron having multitudinous small perforations, radial ribs on one of its surfaces and ribs intersecting the radial ribs.

14. Apparatus for making sulfuric acid, including an absorption chamber, a cover therefor, a plurality of plate sections arranged to constitute in substance a single transverse plate in the chamber spaced from the walls of the chamber, a plurality of gas inlet pipes extending through the cover, each pipe being connected with one of said plate sections and means for securing the pipes to the cover, the individual plate sections defining a common central aperture and being provided with multitudinous small perforations and with depending flanges along their periphery.

15. Apparatus according to claim 14 including a shaft extending through the cover and carrying a propeller in said aperture.

16. Apparatus according to claim 14 including a tubular element depending from the edge defining said central aperture and a shaft extending through the cover and carrying a propeller in said tubular element.

17. Apparatus for promoting absorption of a gas in a liquid, comprising a bowl-shaped absorption chamber, an annular plate extending transversely of the chamber and peripherally spaced from the walls thereof, a tubular element depending from the inner periphery of the plate to near the bottom of the chamber, means for introducing the gas to be absorbed beneath the plate and means for circulating the absorbent liquid upwardly through the tubular element over the plate, the plate having a large number of small perforations.

18. Apparatus according to claim 17 including a curtain depending from the outer peripheral edge of the plate.

19. Apparatus according to claim 17 including a curtain depending from the outer peripheral edge of the plate and a curtain depending from the inner peripheral edge thereof.

20. Apparatus for impregnating a liquid with a gas, comprising a tank, a cover therefor, a substantially annular perforated plate disposed transversely of the tank and spaced from the walls thereof to define a communication between the space above and the space below it, gas inlet conduits passing through the cover down through the plate and terminating at the lower surface thereof, means for interconnecting the cover, the plate and the conduits as a single mechanical unit, a tubular element depending from the inner edge of the plate, and a shaft extending centrally through the cover and carrying at its free end a propeller within the tubular element.

21. Appartus for impregnating a liquid with a gas, comprising a treater chamber, a cover therefor, a substantially annular plate disposed transversely of the chamber and spaced from the walls thereof to define a communication between the space above and the space below it, gas inlet conduits passing through the cover down through the plate and terminating at the lower surface thereof, means for interconnecting the cover, the plate and the conduits as a single mechanical unit, a gas curtain depending from the outer marginal portion of the plate for preventing escape laterally toward the wall of the chamber, a tubular element depending from the inner edge of the plate, and a shaft extending centrally through the cover and carrying at its free end a propeller within the tubular element, the plate having a large number of small perforations.

22. Apparatus according to claim 21 including a dome carried by the cover, the dome forming a gas collecting chamber having an outlet and affording a bearing for the propeller shaft.

23. Apparatus according to claim 20, including a dome carried by the cover, the dome forming a gas collecting chamber having an outlet and affording a bearing for the propeller shaft, the dome having a removable cover carrying a packing gland for the shaft and a sleeve surrounding the shaft, and means at the bottom of the sleeve closing the same and affording a bearing for the shaft.

In testimony whereof I affix my signature.

HENRY HOWARD.